United States Patent

Mori et al.

[11] Patent Number: 5,251,446
[45] Date of Patent: Oct. 12, 1993

[54] MASTER CYLINDER WITH ANNULAR SPACER

[75] Inventors: Kohei Mori; Riichirou Sugimoto, both of Higashimatsuyama, Japan

[73] Assignee: Jidosha Kiki Co., Ltd., Tokyo, Japan

[21] Appl. No.: 802,273

[22] Filed: Dec. 4, 1991

[30] Foreign Application Priority Data

Dec. 28, 1990 [JP] Japan ............................ 2-406095[U]

[51] Int. Cl.⁵ .......................... B60T 11/26; F15B 7/08
[52] U.S. Cl. .......................................... 60/533; 60/588
[58] Field of Search ................ 60/533, 585, 589, 592

[56] References Cited

U.S. PATENT DOCUMENTS

| | | | |
|---|---|---|---|
| 2,245,991 | 6/1941 | Loweke | 60/588 |
| 3,191,385 | 9/1963 | Watanabe . | |
| 3,545,206 | 12/1970 | Belart | 60/588 |
| 3,980,004 | 9/1976 | Jones et al. | 60/588 X |
| 4,932,312 | 6/1990 | Sugimoto . | |
| 5,036,664 | 8/1991 | Comm | 60/588 X |
| 5,063,743 | 11/1991 | Mori et al. | 60/588 X |

FOREIGN PATENT DOCUMENTS 2030668 9/1979 United Kingdom .

Primary Examiner—John T. Kwon
Assistant Examiner—John Ryznic
Attorney, Agent, or Firm—Birch, Stewart, Kolasch & Birch

[57] ABSTRACT

In a master cylinder, a communicating passage is formed in a piston guide which is disposed in a cylinder housing so that the communication passage is in communication with the through hole in said piston guide for supplying oil, and an annular spacer is interposed between the annular seal disposed at the side of the piston guide and the piston guide, an annular spacer which has a plurality of projections protruding outward from the external surface at intervals, so that the annular spacer is positioned in the cylinder housing with the projections of the annular spacer abutting the internal surface of the cylinder housing, and an oil passage is formed between the external surface of the annular spacer excluding the projections and the internal surface of the cylinder housing.

3 Claims, 5 Drawing Sheets

MASTER CYLINDER WITH ANNULAR SPACER

BACKGROUND OF THE INVENTION

1. Field of the Invention

This invention relates to a master cylinder for sending oil under pressure to a driven unit such as a wheel cylinder.

2. Description of Related Art

FIG. 9 partially shows a conventional master cylinder.

This master cylinder has a piston guide 2 disposed in a cylinder housing. The piston guide 2 has a through hole 3 drilled therein so that a passage 4 which is in communication with an oil reservoir (not shown) opens to a pressure chamber 5 via the through hole 3 in the inoperative state. A piston 6 has a through hole 7 formed in its cylindrical wall. As shown in FIG. 9, the pressure chamber 5 communicates with the oil reservoir (not shown) through the through hole 7, a clearance portion 38 between the piston 6 and the piston guide 2, and the through hole 3 of piston guide 2. Therefore, if the oil in the pressure chamber 5 falls short, oil is supplied from the oil reservoir to the pressure chamber 5.

In this master cylinder, an annular seal 8 is attached to the side surface of piston guide 2 at the side of pressure chamber 5 (left side surface in FIG. 9). When the piston 6 is pushed into the pressure chamber 5 and the through hole 7 of piston 6 passes through the annular seal 8, the communication between the through hole 7 and the through hole 3 of piston guide 3 is cut off. When the piston 6 is pushed further into the pressure chamber 5, the oil in the pressure chamber 5 is pressurized and fed to a driven unit such as a wheel cylinder (not shown).

When the piston 6 returns (moves to the right in FIG. 9), the pressure in the pressure chamber 5 becomes negative, so that the external portion 8a of annual seal 8 disengages from the internal surface of a sleeve 9 (the internal surface of cylinder) as shown by the dash-and-dot line in FIG. 10. As a result, a narrow passage 10 is formed between them. Consequently, an oil path is formed by the passage 10, a passage 11 formed between the internal surface 9a of sleeve 9 and piston guide 2, the through hole 3 in the piston guide 2 and the passage 4, through which oil is supplied from the oil reservoir (not shown) to the pressure chamber 5. Thus, the master cylinder is so constructed that the action of the driven unit is not hindered by the negative pressure in the pressure chamber 5.

In the master cylinder of such a type, it is desirable to make the passage (gap) 11 as large as possible in order to ensure good pumping properties by smoothly supplying oil to the pressure chamber, for example, in the pumping brake operation in which a brake pedal is depressed repeatedly. However, if the passage 11 is made large, there is a risk of the edge portion 8b of annular seal 8 (refer to FIG. 10) being deformed elastically and intruding into the gap between the internal surface 9a of sleeve 9 and the external surface 2a of piston guide 2 when the piston moves toward the pressure chamber 5.

If this occurs, the edge portion 8b of annular seal 8 is damaged, resulting in decreased durability. Also, the abrasion powder enters the passage 11, which hinders the formation of passage during the brake pumping operation, leading to the disturbance of a smooth brake pumping operation.

One possible solution to these problems is that a communicating passage A is formed in the piston guide 2 as shown by the dash-and-dot line in FIG. 10. The communicating passage A is in communication with the passage 3 and opens to the side surface 2b of piston guide 2 so that the communication passage A serves as an oil passage to ensure large oil passage during the pumping operation. In this configuration, when the annular seal 8 is urged against the side surface 2b of piston guide 2, a part of the abutting surface of annular seal 8 is deformed elastically, and may intrude into the communicating passage A in the piston guide 2. When the communicating passage A is formed in the piston guide 2 as described above, therefore, an annular spacer B may be interposed between the piston guide 2 and the annular seal 8 as shown by the dash-and-dot line in FIG. 10, which, however, presents a difficulty in easy assembling and positioning of the annular spacer B. For example, if the annular spacer B is so designed that it is assembled with the piston guide 2 being used as a guide on the internal surface, there is a problem of difficult assembling of the annular spacer B and its associated parts.

OBJECT AND SUMMARY OF THE INVENTION

It is a primary object of the present invention to prevent the intrusion of an annular seal during the advancement of a piston by using an annular spacer similar to that described above, and to provide a sufficiently large oil passage for ensuring good pumping property despite the presence of the annular spacer.

It is another object of the present invention to efficiently assemble the annular spacer into the cylinder.

It is a further object of the present invention to ensure the durability of the annular seal.

To attain these objects, in a master cylinder according to the present invention, which has a piston guide disposed in a cylinder housing, a cylindrical piston inserted through the piston guide, and an annular seal attached to the piston guide for effecting a seal between the piston guide and the piston, and in which the oil reservoir is connected to the pressure chamber by through holes formed from the external surface to the internal surface in the piston guide and the piston, and the communication between the oil reservoir and the pressure chamber is cut off by moving the piston so that the through hole in the piston moves along the annular seal, the master cylinder comprises a communicating passage formed in the piston guide which is in communication with the through hole in the piston guide and opens to the side surface of the piston guide, and an annular spacer interposed between the side surface of the piston guide and the annular seal which has a plurality of projections protruding outward from the external surface at intervals, so that the annular spacer is positioned in the cylinder housing with the projections of the annular spacer abutting the internal surface of the cylinder housing, and an oil passage is formed between the external surface of the annular spacer excluding the projections and the internal surface of the cylinder housing.

DETAILED DESCRIPTION OF PREFERRED EMBODIMENTS

Figure 1:
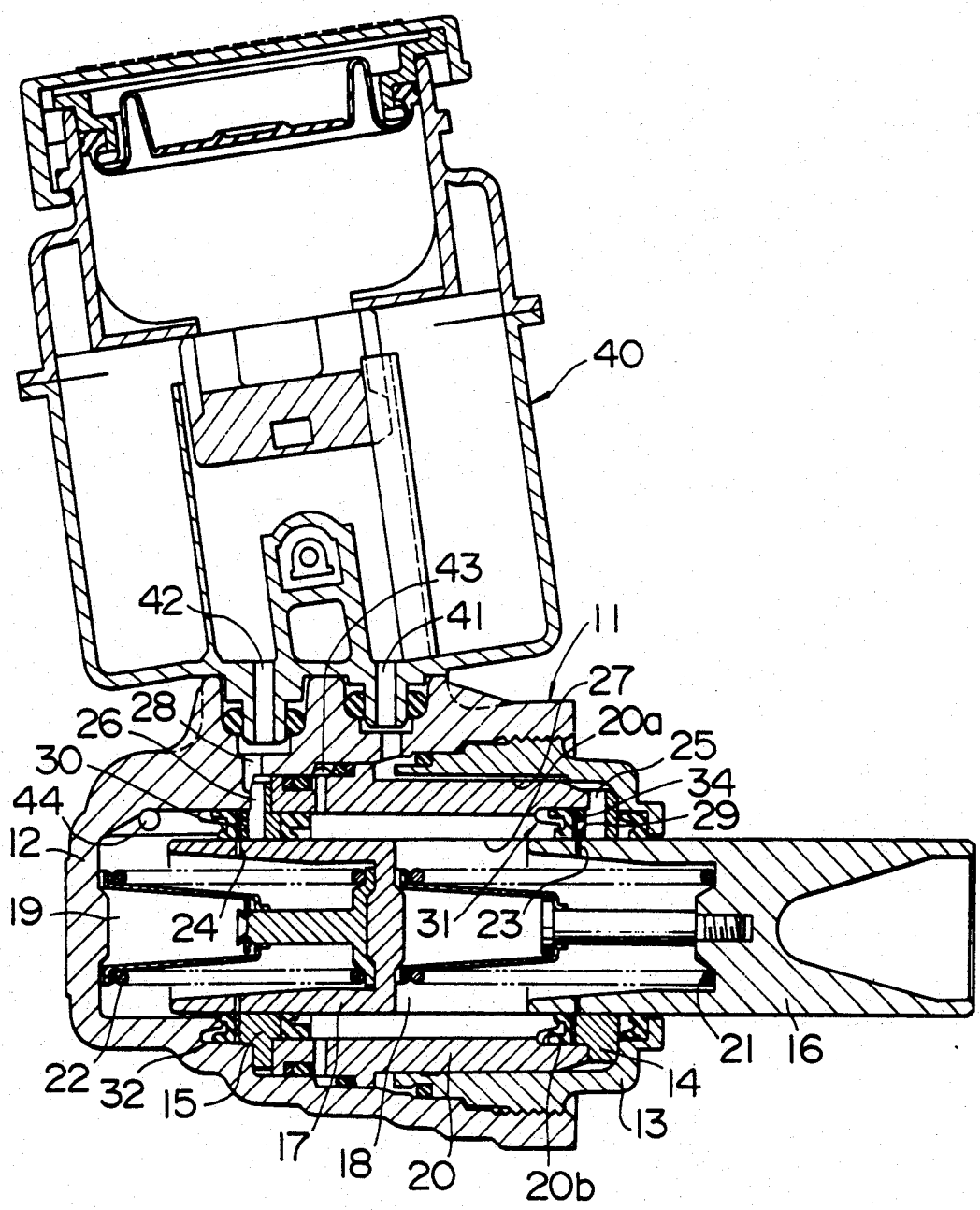
FIG. 1 is a sectional view of a master cylinder in accordance with the invention.

FIG. 1 shows a master cylinder in accordance with the invention, in which a cylinder housing 11 is composed of a body 12 and a cap 13 screwed in the body 12. In the cylinder housing 11, ring-shaped piston guides 14, 15 are disposed, through which pistons 16, 17 are inserted, respectively. The piston guide 15 and the piston 17 define two pressure chambers 18, 19 in the cylinder housing 11.

The pistons 16, 17 mentioned above are also guided by a sleeve 20 disposed in the pressure chamber 18. The internal surface of the sleeve 20 is formed in a spline shape to ensure communication between the pressure chamber 18 and an extrusion hole 43 so that the pistons 16, 17 are guided by the projected portions 20a. At the internal surface end of the sleeve 20, an annular cutout portion 20b is formed, by which an annular seal described later is retained.

The pistons 16, 17 are tensioned to the right in FIG. 1 at all times by springs 21, 22 mounted between the pistons 16 and 17 and between the piston 17 and the body 12. Each of these pistons 16, 17 has a cavity opening to the end, and the cylindrical wall forming this cavity has a through hole 23, 24, respectively, drilled therein. The piston guides 14, 15 have through holes 25, 26 extending in the radial direction, respectively. One end of through hole 25, 26 opens to the sliding interface of piston 16, 17 and the other end is in communication with the passage 27, 28 formed in the cylinder housing. Moreover, the piston guide 14, 15 has a communicating passage 29, 30, respectively, which is in communication with the through hole 25, 26 and extends in the axial direction to open to one side surface of piston guide 14, 15 (the surface abutting against the annular seal).

Figure 2:
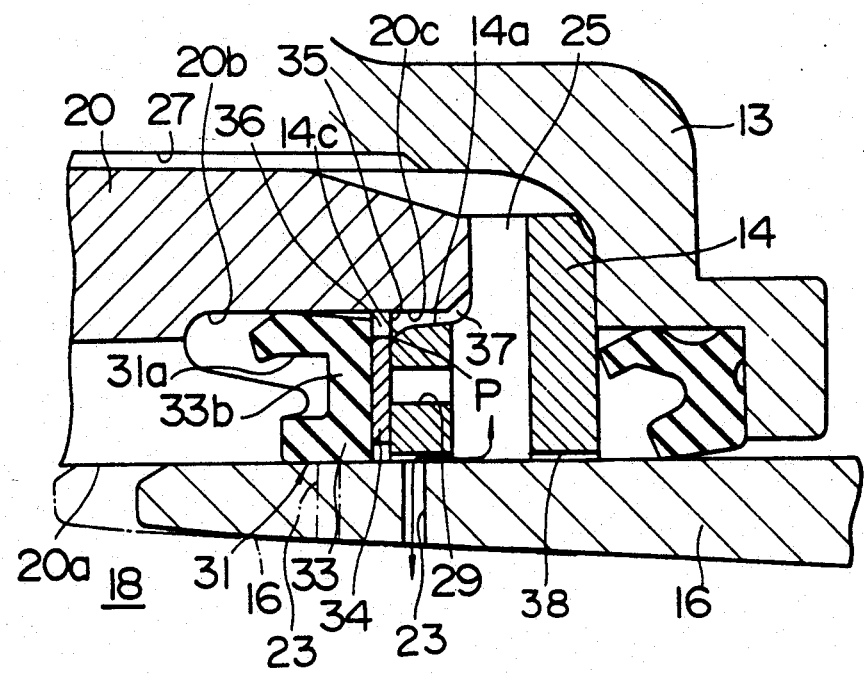
FIG. 2 is an enlarged sectional view of the main portion of the master cylinder of FIG. 1.

At the side of pressure chamber 18, 19 of the piston guide 14, 15, a seal assembly 31, 32 is attached. One seal assembly 31 is composed of a rubber annular seal 33 with a substantially U-shaped cross section and an annular spacer 34 formed of rigid resin, metal and the like material, as shown in FIG. 2.

Figure 3:
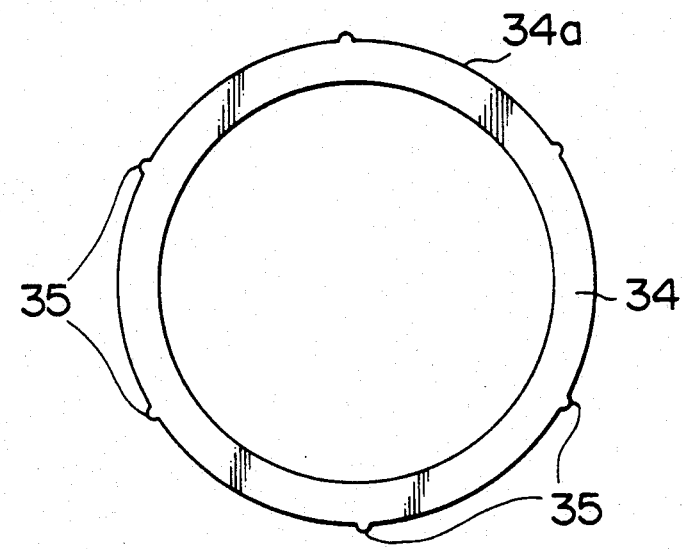
FIG. 3 is a plan view of an annular spacer.
Figure 4:
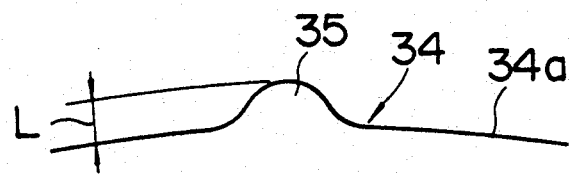
FIG. 4 is an enlarged sectional view of the projection of the annular spacer shown in FIG. 3.

The annular spacer 34 is formed in a circular form as a whole as shown in FIG. 3. On its external surface 34a, circular arc shaped projections 35 are integrally formed which protrude outwardly (outside diameter side) with the same height at several locations in substantially equal intervals. Thus, an appropriate gap L lies between the external surface 34a of annular spacer 34 and a circle passing through the apexes of a plurality of projections 35 as shown in FIG. 4.

The end of annular recess portion 31a of annular seal 33 is mounted in the cutout portion 20b of sleeve 20. Between the side wall portion 33b of annual seal 33 and the piston guide 14 fixed in the cylinder housing 11 is interposed the annular spacer 34. The annular spacer 34 is assembled in such a way that the projections 35 come into contact lightly with the internal surface 20c of sleeve 20, so that an oil passage 36 of gap L lies between the internal surface 20c and the external surface 34a of annular seal 34 (refer to FIGS. 2 and 8).

Figure 5:
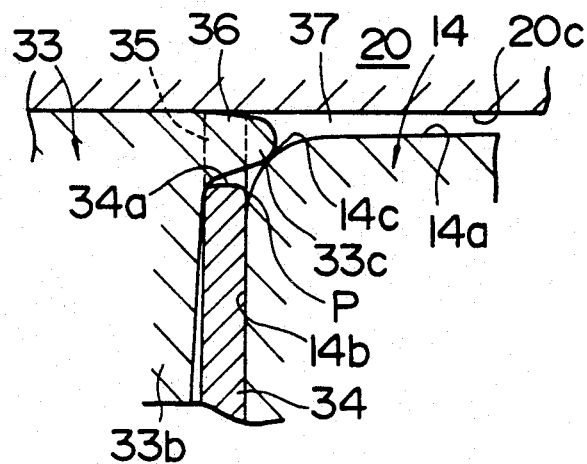
FIG. 5 is an enlarged sectional view showing the deformation of the annular seal during the advancement of a piston.

As seen clearly from FIG. 5, a small gap is formed between the external surface 14a of piston guide 14 and the internal surface 20c of sleeve 20. This gap provides an oil passage 37.

The external corner 14c of piston guide 14 at the annular spacer side is chamfered so that the cross section has a circular arc shape. The external surface 34a of annular spacer 34 is in line with the start point of a circular arc portion of corner 14c (the boundary position between the side surface 14b of piston guide 14 and the circular arc corner 14c).

The other seal assembly 32 and piston guide 15 are constructed in the same way as the seal assembly 31 and piston guide 14 described above; therefore, the explanation is omitted.

Referring to FIG. 1, reference numeral 40 denotes an oil reservoir, which is fixedly secured to the housing 11. Passages 41, 42 formed in the bottom of oil reservoir 40 are in communication with passages 27, 28 in the cylinder housing 11, respectively. Reference numerals 43, 44 denote holes drilled in the cylinder housing 11. Through these holes 43, 44, the pressure chambers 18, 19 are connected to a driven unit such as a wheel cylinder (not shown).

Figure 8:
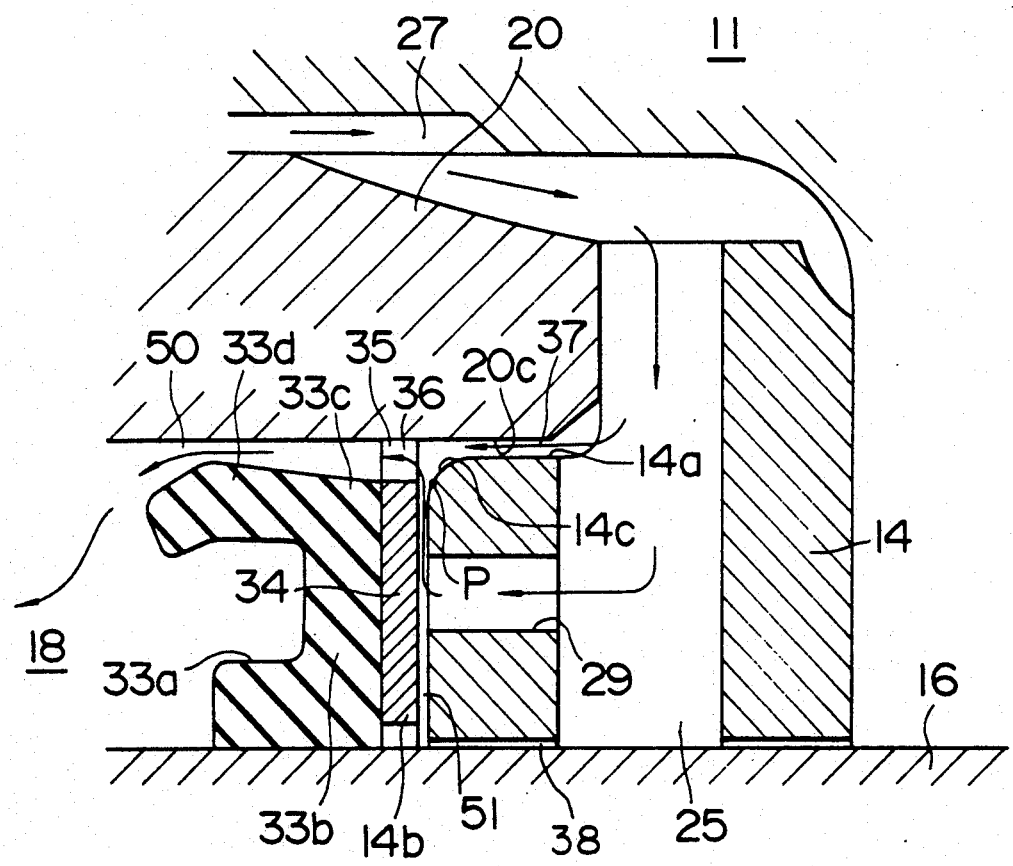
FIG. 8 is an enlarged sectional view of the main portion of a master cylinder during the retraction of the piston.
Figure 9:
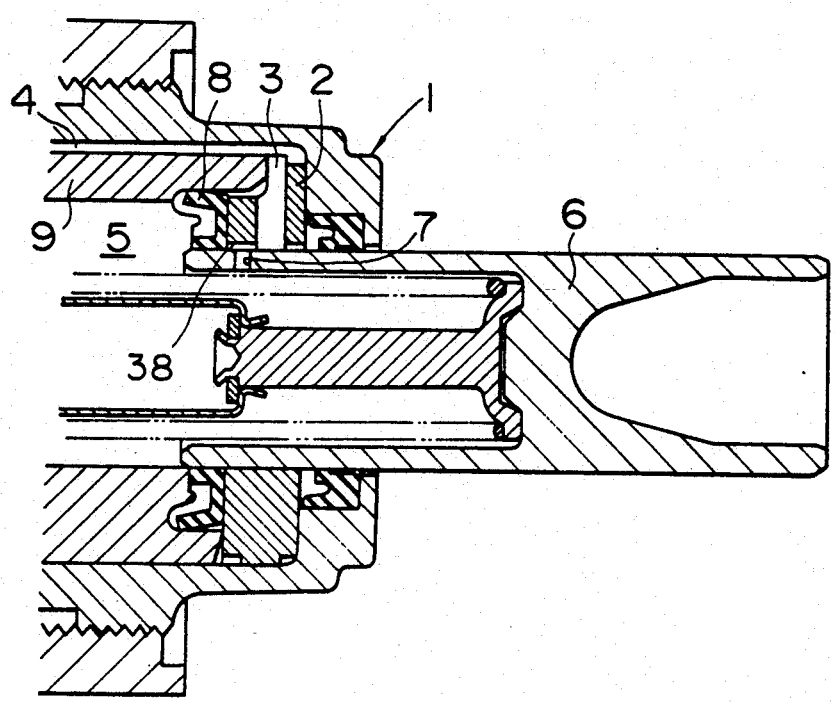
FIG. 9 is a sectional view of a main portion of the conventional master cylinder.
Figure 10:
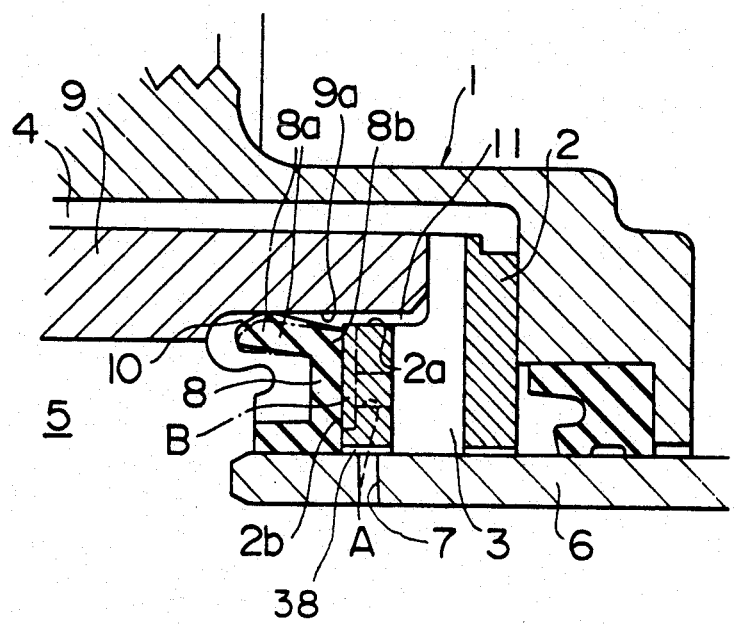
FIG. 10 is an enlarged sectional view of the main portion of the master cylinder shown in FIG. 9, in which the annular spacer is assembled by positioning its internal surface in relation to the piston guide.

Next, the operation of the above-described master cylinder will be described by referring mainly to FIGS. 2 and 8. FIGS. 2 and 8 show the piston 16, piston guide 14, seal assembly 31 and so on at one side only. Since the piston 17, piston guide 15, seal assembly 32 and so on at the other side operate in the same way, the explanation thereof is omitted.

The solid line in FIG. 2 indicates the inoperative state, namely the standby state, of piston 16. In this state, the through hole 23 of piston 16 communicates with the through hole 25 of piston guide 14 through the clearance portion 38 between the piston 16 and the piston guide 14, so that the pressure chamber 18 connects to the oil reservoir 40 via the through hole 23, clearance portion 38, through hole 25, and passage 27. In this state, therefore, oil pressure is not applied to a driven unit (not shown).

In this state, oil does not flow through the communicating passage 29, and the annular spacer 34 is engaged with the side surface 14b of piston guide 14. Therefore, the communicating passage 29 is closed by the annular spacer 34.

Under this circumstance, when the piston 16 is pushed into the pressure chamber 18, the through hole 23 also moves to the left as shown by the dash-and-dot line in FIG. 2. As a result, the communication between the through hole 23 and through hole 25 is cut off, and oil of an amount corresponding to the pushed amount of piston 16 is supplied from the pressure chamber 18 to the driven unit (not shown).

When the pushing action of piston 16 into the pressure chamber is stopped, the piston 16 is returned by the tension of spring 21. The returning movement of piston 16 produces a negative pressure in the pressure chamber 18, which moves the external portion of 33d of annular seal 33 away from the internal surface 20c of sleeve 20, resulting in the formation of a passage 50 between them as shown in FIG. 8. At the same time, the annular spacer 34 moves away from the side surface 14b of piston guide 14 resulting in the formation of a passage 51 of small width therebetween. Consequently, the communicating passage 29 of piston guide becomes in a open state, and the oil reservoir 40 is connected to the pressure chamber 18 via the passage 27, through hole 25, communicating passage 29, passage 51, oil passage 36 between the annular spacer 34 and internal surface 20c, and passage 50, so that the oil in the oil reservoir 40 is supplied to the pressure camber 18 through these passages. At the same time, the oil is supplied into the pressure chamber 18 via the passage 27, through hole 25, oil passage 37, oil passage 36, and passage 50.

Particularly in brake pumping operation, the reciprocating movement of piston 16 is repeatedly performed a little at a time. Accordingly, the oil supply from the pressure chamber 18 to the driven unit (not shown) and the oil supply from the oil reservoir 40 to the pressure chamber are repeatedly performed little by little. In the returning movement of piston 16, a sufficient amount of oil is supplied to the pressure chamber via the above-described two oil paths.

The master cylinder according to this invention has the following advantages: The installation of the communicating passage 29 in the piston guide 14 and the gap L used for oil passage 36 between the external surface 34a of annular spacer 34 and the internal surface 20c of sleeve 20 (corresponding to the internal surface of cylinder) provides a separate oil passage in addition to the oil passage formed between the internal surface 20c of sleeve 20 and the external surface 14a of piston guide 14, ensuring a larger oil path area as a whole. Consequently, oil flows fully and smoothly, particularly in the brake pumping operation, ensuring good pumping property.

Moreover, the annular spacer 34 and the associated parts can be assembled easily. Specifically, the seal assembly 31 consisting of the annular seal 33 and the annular spacer 34 and the piston guide 14 are mounted on the piston 16, the piston assembly thus assembled is inserted into the sleeve 20 in the cylinder housing 11, and then the seal assembly 31 and the piston guide 14 are fixedly positioned at the cylinder housing 11 side by screwing the cap 13 into the body 12. In assembling, when the piston assembly is inserted, the piston assembly is slid in the inserting direction with the apexes of projections 35 of annular spacer 34 abutting against the internal surface 20c of sleeve 20. Therefore, there is no need for special positioning or assembling operation of the annular spacer 34, enabling easy and accurate positioning of the annular spacer 34 in the cylinder housing 11 by merely pushing the piston assembly.

Figure 6:
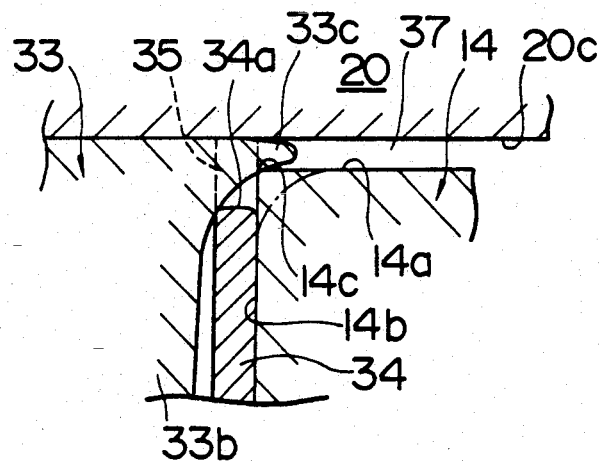
FIG. 6 is an enlarged sectional view showing the intrusion of the annular seal caused when the corner of a piston guide has an edge shape.
Figure 7:
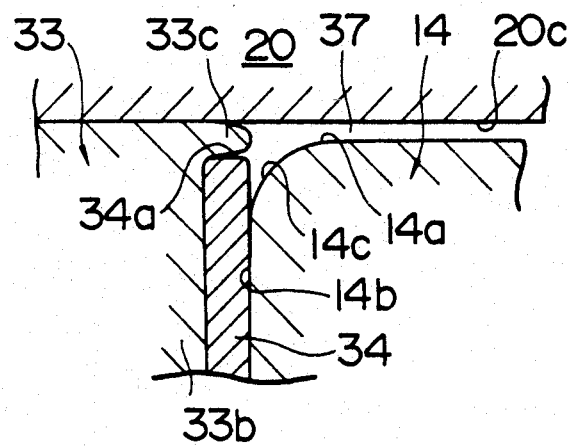
FIG. 7 is an enlarged sectional view showing the intrusion of the annular seal caused when the external surface of the annular spacer is disposed at the internal surface side of a sleeve beyond the start point of a circular arc portion of the piston guide.

In this embodiment, the corner 14c of piston guide 14 which is adjacent to the external surface 34a of annular spacer 34 is chamfered so that its cross section has a circular arc shape, and the external surface 34a of annular spacer 34 (excluding the projections 35) is in line with the start point P of the circular arc, so that a damage owing to the intrusion of the annular seal 33 can be effectively prevented. If the corner 14c of piston guide 14 is in a substantially right-angled edge shape and positioned at the side of internal surface 20c of sleeve 20 beyond the external surface 34a of annular spacer 34 as shown in FIG. 6, the external corner portion 33c of annular seal 33 intrudes into the oil passage 37 of gap L by being deformed elastically and may be held between the edge-shaped corner 14c and the internal surface 20c. If the external surface 34a of annular spacer 34 is positioned at the side of internal surface 20c of sleeve 20 beyond the point P of the piston guide, as shown in FIG. 7, the external corner portion 33c of the annular seal 33 may be held between the external surface 34a of the annular spacer 34 and the internal surface 20c of the sleeve 20. If the annular seal 33 intrudes and is held between the parts, the external corner portion 33c of the annular seal 33 will be damaged, leading to the decrease in durability. Also, the master cylinder may malfunction.

In the master cylinder of this embodiment, however, since the annular spacer 34 and the piston guide 14 are arranged in a special form as shown in FIGS. 5 and 8, the external corner portion 33c of annular seal 33 only moves into the space between the circular arc portion 14c of piston guide 14 and the internal surface 20c of sleeve 20, but is not held between the external surface 14a of piston guide 14 and the internal surface 20c of sleeve 20 even when the external corner portion 33c of annular seal 33 is deformed elastically and enters the space between the external surface 34a of annular spacer 34 and the internal surface 20c of sleeve 20. Therefore, the annular seal 33 is not damaged, resulting in improved durability of the annular seal 33.

Although the invention has been described in its preferred form, the invention is not limited to the above-described embodiments, and various changes and modifications may be made on the basis of the technical idea of this invention. For example, the shape and number of the projections 35 formed on the annular spacer 34 can be changed as necessary.

According to this invention, the piston guide has the communicating passage which is in communication with the through hole for oil flow and opens to the side surface of piston guide, and the annular spacer is interposed between the side surface of piston guide and the annular seal, the annular spacer which has a plurality of projections on the external surface so that the projections abut the internal surface of the cylinder housing (for example, the internal surface 20c of sleeve 20 in the above embodiment). Therefore, the presence of the communicating passage in the piston guide and the passage formed between the external surface of the annular spacer excluding the projections and the internal surface of the cylinder provides a sufficiently large oil path when the piston returns particularly in the brake pumping operation, ensuring good pumping properties.

Furthermore, since a sufficiently large oil passing area is provided, the width of oil passage between the piston guide and the internal surface of the cylinder can be decreased, which prevents the intrusion of the annular seal into this oil passage, resulting in increased durability of the annular seal.

Additionally, since the projections disposed on the external surface of the annular spacer abut the internal surface of the cylinder, the annular spacer and the associated parts can be inserted and positioned easily and accurately into the cylinder with the projections being used as a guide in assembling.

Furthermore, since the internal surface of the annular spacer can be accurately positioned in relation to the external surface of the piston, damage owing to the contact of the annular spacer and piston can be prevented.

What is claimed is:

1. A master cylinder comprising:

a piston guide disposed in a cylinder housing;

a cylindrical piston inserted through said piston guide; and an annular seal attached to said piston guide for effecting a seal between said piston guide and said piston, wherein an oil reservoir is connected to a pressure chamber by through holes formed from the external surface to the internal surface in said piston guide and said piston, and the communication between said oil reservoir and said pressure chamber is cut off by moving said piston so that the through hole in said piston moves along said annular seal, said master cylinder including:

a communicating passage formed in said piston guide which passage is in communication with the through hole in said piston guide and opens to a side surface of said piston guide, an annular spacer interposed between the side surface of said piston guide and said annular seal which spacer has a plurality of projections protruding outward from the external surface at intervals, whereby said annular spacer is positioned in said cylinder housing with the projections of said annular spacer abutting the internal surface of said cylinder housing, and an oil passage formed between the external surface of said annular spacer excluding said projections and the internal surface of said cylinder housing.

2. A master cylinder according to claim 1 wherein a corner of said piston guide adjacent to the external surface of said annular spacer is chamfered so that the cross section has a circular arc shape, and the external surface of said annular spacer is in line with the start point of said circular arc shape.

3. A master cylinder according to claim 1 or 2 wherein when said piston returns, the oil supplied to the through hole in said piston guide is fed to said pressure chamber via two paths of the passage formed on the external side of said piston guide and the communicating passage in said piston guide, and subsequently via a passage formed between the external surface of said annular spacer and the internal surface of said cylinder housing, and via a passage formed between said annular seal and the internal surface of said cylinder housing.

* * * * *